(12) United States Patent
Brittingham et al.

(10) Patent No.: US 7,092,987 B2
(45) Date of Patent: Aug. 15, 2006

(54) REMOTE COMPUTER CAPABILITIES QUERYING AND CERTIFICATION

(75) Inventors: Peter Brittingham, Titusville, NJ (US); Douglas Forer, Trenton, NJ (US); Kevin Bentley, Lambertville, NJ (US)

(73) Assignee: Educational Testing Service, Princeton, NJ (US)

( * ) Notice: Subject to any disclaimer, the term of this patent is extended or adjusted under 35 U.S.C. 154(b) by 636 days.

(21) Appl. No.: 09/781,248

(22) Filed: Feb. 13, 2001

(65) Prior Publication Data

US 2002/0112052 A1 Aug. 15, 2002

(51) Int. Cl.
*G06F 15/16* (2006.01)
*G06F 9/44* (2006.01)
*G06F 9/445* (2006.01)
*H04M 11/00* (2006.01)

(52) U.S. Cl. .............. 709/203; 709/201; 709/227; 709/229; 717/171; 717/177; 717/178

(58) Field of Classification Search ................ 709/201, 709/203, 223, 224, 227, 229; 717/171, 177, 717/178
See application file for complete search history.

(56) References Cited

U.S. PATENT DOCUMENTS

| | | | |
|---|---|---|---|
| 5,732,218 A * | 3/1998 | Bland et al. ............... | 709/224 |
| 6,466,971 B1 * | 10/2002 | Humpleman et al. ....... | 709/220 |
| 6,470,378 B1 * | 10/2002 | Tracton et al. ............. | 709/203 |
| 6,584,507 B1 * | 6/2003 | Bradley et al. ............ | 709/229 |
| 6,694,369 B1 * | 2/2004 | Vepa et al. ................. | 709/228 |
| 6,738,803 B1 * | 5/2004 | Dodrill et al. ............. | 709/223 |
| 6,820,125 B1 * | 11/2004 | Dias et al. .................. | 709/203 |
| 2002/0104025 A1 * | 8/2002 | Wrench, Jr. ................ | 709/227 |
| 2003/0014505 A1 * | 1/2003 | Ramberg et al. ........... | 709/223 |

* cited by examiner

*Primary Examiner*—Zarni Maung
*Assistant Examiner*—Hassan Phillips
(74) *Attorney, Agent, or Firm*—Pepper Hamilton LLP; W. Joseph Melnik

(57) ABSTRACT

A remote client computer performance/compatibility querying and certification system allows a server to remotely gather performance/capability information from a client computer, such as its processor class or family, display resolution capability, installed software components, peripheral devices, or the type and version of its operating system, and determine whether it is capable of accessing and utilizing an on-line service via a communication network. The performance/capability information is gathered using a querying program downloaded from the server and running on the client computer. The querying program queries the system/component registry of the client computer's operating system using, e.g., one or more application program interface function calls. The gathered performance/capability information is used to, e.g., pre-certify the client computer before utilizing the on-line service, determine whether the user desires to purchase software on-line, and/or provide an expert technician information regarding the client computer's installed software/hardware components during an on-line technical support session.

24 Claims, 4 Drawing Sheets

REMOTE COMPUTER CAPABILITIES QUERYING AND CERTIFICATION

FIELD OF THE INVENTION

This invention relates generally to the field of collaborative computing and/or computer network based applications, and more particularly, to a method and apparatus for remotely querying and certifying capabilities and/or compatibilities of client computers over a computer network.

BACKGROUND OF THE INVENTION

A substantial increase in the use of computers has been seen in recent years, and along with this increase has come an explosion in the use of computer networks, e.g., a local area network (LAN) and a wide area network (WAN), e.g., the Internet, particularly the world-wide-web (WWW). Nowadays, a plethora of products and services are offered "on-line" over the various computer networks, which act as a communication conduit between a supplier (often referred to as a "server") and a user (often referred to as a "client") of the various products and services.

Often, in order for a user to utilize the information objects and services available on-line, the client computer of the user must have some minimum performance capability. For example, typical on-line services may require the client computer to have a particular processor family or later, a minimum display resolution, a minimum memory capacity, one or more peripheral devices or the like. The client computer may also be required to have installed thereon software components, e.g., a specific version of web browser, one or more plug-in modules, one or more dynamic linked libraries (DLL) or the like. Some on-line services, e.g., a service providing distant learning programs, which may involve transferring of a large amount of multimedia data, may require the client computer to have a minimum communication bandwidth capability. Software products available to be purchased on-line may have a compatibility requirement, e.g., a particular operating system, a particular processor family or the like.

Many of the on-line service providers and on-line software suppliers list the minimum performance/capability and compatibility information, respectively, from which a user may verify whether his or her computer has sufficient performance/capabilities for the particular on-line service, or whether it is compatible with a particular software product the user wishes to purchase on-line.

Unfortunately, a typical user of an on-line service or an on-line purchaser of a software product may not know the performance/capability of, or the software/hardware components installed on, his or her computer, and thus may not be able to accurately determine whether his or her computer is compatible with the on-line service or the software product. A user or purchaser often assumes that his/her computer is compatible, and, if the assumption was incorrect, experiences difficulties in accessing the services or in installing and running the software product. Because the user may be unaware which aspect of the performance/capability/compatibility requirement the user computer does not meet, the user may not be able to remedy the incompatibility problem. The incompatibility problem may even result in a fatal failure of the user computer, rendering it inoperable even after an attempt by the user to restore operability, e.g., by rebooting or the like, and may thus be inconvenient and frustrating to the user.

It is thus desirable for the on-line service and product suppliers to remotely determine the compatibility of a particular user computer directly from the user computer before the user attempts to utilize an on-line service or purchases a software product on-line.

Moreover, one particularly useful service available on-line is what is usually referred to as an on-line "help desk", which provides technical support to a user, who may be experiencing difficulties operating the user computer. Typically, to utilize an on-line help desk service, the user would either ask a specific question, or provide information regarding the difficulties the user is experiencing, either over the telephone or on-line, e.g., through a dialog box provided in the website of the service provider or through an e-mail message or the like, to an expert technician employed by the service provider.

It is often very useful for the expert technician to find out what software and/or hardware components installed on the user computer in order to accurately diagnose the particular problem he or she is trying to solve. A typical user is however technically inept at supplying the necessary or desired information to the technician. It is thus desirable to provide a mechanism through which the expert technician can remotely query the user computer for information regarding the installed components thereon.

Known prior attempts, e.g, the on-line help service provided by Expertcity.com of Santa Barbara, Calif., to remotely query the user computer by an on-line expert technician uses a "screen sharing" program, similar to the well known PCANYWHERE™ sold by the Symantec Corporation of Cupertino, Calif. These so called screen sharing programs while allowing an expert technician to determine the installed components of a user computer, require the user to completely surrender control of the user computer to the expert technician, who may be free to gather information unnecessary for the technical support, and which may be confidential, sensitive or private. That is, through these screen sharing programs, the expert technician may view, copy or alter any of the files stored on the user computer, and, if, e.g., the user computer is connected to a network. e.g., a LAN, any file stored on any of the computers connected to the network. It is thus desirable that the query for the installed component be performed by a computer program written specifically for gathering the installed component information only, rather than turning the complete control of the user computer over to a human technician.

Thus, there is a need for a method and system, which allows an on-line service and software product supplier to remotely determine the performance, capability and/or compatibility of a user computer before the user attempts to utilize the on-line service or purchases the software product on-line.

Thus, there is also a need for a querying program that remotely gathers information regarding the components installed on a user computer, and provides the gathered information to an expert technician of an on-line help desk service.

SUMMARY OF THE INVENTION

In accordance with the principles of the present invention, a method of querying a client computer by a server over a communication network to determine whether the client computer has sufficient performance capability in order to utilize an on-line service comprises: allowing a query program to be downloaded to the client computer, the query program, upon execution, querying the client computer for at least one performance parameter, transmitting at least one performance parameter to the server over the communication network, determining whether the client computer has a sufficient performance capability to utilize the on-line service based on at least one performance parameter.

In accordance with another aspect of the principles of the present invention, one or more computer programs embedded on a computer readable storage medium implements a method of querying a client computer by a server over a communication network to determine whether the client computer has sufficient performance capability in order to utilize an on-line service, and comprises a set of instructions for: allowing a query program to be downloaded to the client computer, the query program, upon execution, querying the client computer for at least one performance parameter, transmitting at least one performance parameter to the server, and determining whether the client computer has a sufficient performance capability to utilize the on-line service based on at least one performance parameter.

In accordance with another aspect of the principles of the present invention, a system for remotely querying a client computer by a server over a communication network comprises a communication network, and a server configured to allow a query program to be downloaded to the client computer, the query program, upon execution, querying the client computer for at least one performance parameter, the server further configured to receive the at least one performance parameter from the querying program, and to determine whether the client computer has a sufficient performance capability to utilize the on-line service based on the at least one performance parameter.

In accordance with yet another aspect of the principles of the present invention, a method of providing information regarding one or more components installed on a user computer to an expert technician during an on-line technical support session with a sever over a communication network comprises: allowing a query program to be downloaded to the user computer, the query program, upon execution, querying the user computer for information regarding the one or more components installed on the user computer, transmitting the information to the server, and displaying the information to the expert technician.

BRIEF DESCRIPTION OF THE DRAWINGS

Features and advantages of the present invention will become apparent to those skilled in the art from the following description with reference to the drawings, in which.

DETAILED DESCRIPTION OF PREFERRED EMBODIMENTS

For simplicity and illustrative purposes, the principles of the present invention are described by referring mainly to an exemplary embodiment thereof. However, one of ordinary skill in the art would readily recognize that the same principles are equally applicable to and can be implemented in any other embodiments without departing from the true spirit and scope of the principles of the present invention.

In accordance with the principles of the present invention, a remote client computer performance/compatibility querying and certification system allows a server to remotely query a client computer over a communication network to gather performance/capability information of the client computer, e.g., the processor class or family, the type and the version of the operating system, display resolution capability, installed software components, peripheral devices connected to the client computer and/or the like, and determines whether the client computer is capable of accessing and utilizing an on-line service available over the communication network.

The performance/capability information is gathered by the use of a querying program downloaded from the server, and running on the client computer. The querying program may query, e.g., through one or more application program interface (API) function calls, the system/component registry of the operating system of the client computer.

The gathered performance/capability information may be used, e.g., to pre-certify the client computer before the user attempts to utilize the on-line service, to determine whether the client computer is compatible with a software product, which the user of the client computer desires to purchase on-line over the communication network, and/or to provide an expert technician information regarding the installed software/hardware components of the client computer during an on-line technical support session.

Figure 1:
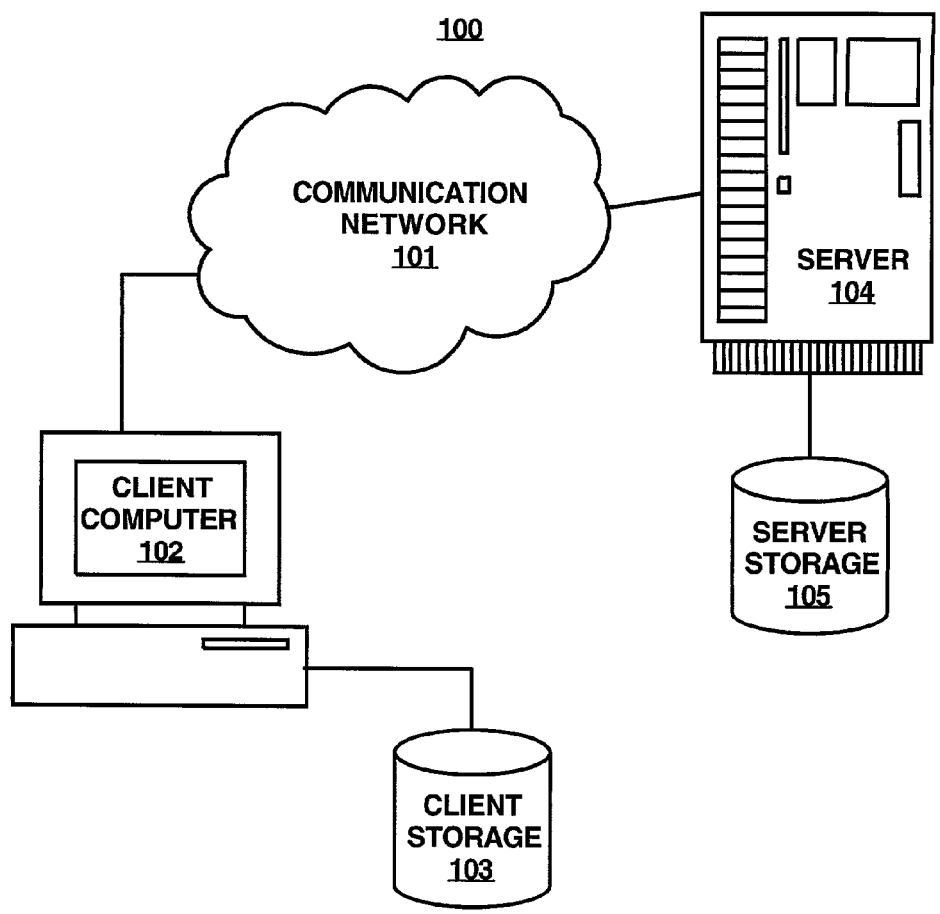
FIG. 1 shows an exemplary embodiment of the remote client computer performance/compatibility querying and certification system in accordance with the principles of the present invention.

In particular, FIG. 1 shows an exemplary embodiment of the remote client computer performance/compatibility querying and certification system 100 in accordance with the principles of the present invention. As shown, the system 100 comprises a communication network 101, which may be, inter alia, a local area network (LAN) or a wide area network (WAN), e.g., the Internet—and particularly the world wide web (WWW), which may comprise a plurality of computers, routers, gateways and/or portions of the Public Switched Telephone Network (PSTN), as known to those familiar with the architecture of the Internet.

The client computer 102 (although for simplicity only one client computer 102 is shown in FIG. 1, it should be understood that there may be any number of client computers) communicates with the server 104, e.g., using a web browser, e.g., the NAVIGATOR® from the Netscape Communications Corporation of Mountain View, Calif., USA, or the INTERNET EXPLORER® from the Microsoft Corporation of Redmond, Wash., USA, installed on the client computer 102.

The server 104 (although for simplicity only one server 104 is shown, it should be understood that there may be any number of servers offering various products and services on-line) provides an interface, e.g., one or more web pages and/or applications viewable and accessible by the client computer 102 through the communication network 101, using a web browser installed on the client computer 102. The interface may be, e.g., hypertext markup language (HTML) pages, dynamic hypertext markup language (DHTML) pages, JAVASCRIPT™, active server pages (ASP) or the like.

The server 104 may maintain a client computer database and user profile database in the server storage 105. The client computer database may have stored therein, inter alia, an identification and/or performance/capacity/compatibility information of client computers 102, which have previously been certified by the server 104. The user profile database may contain therein identification and/or password information for each user of the client computers having a record in the client computer database. The server 104 may further maintain, in the server storage 105, a minimum performance/capability requirement criteria for at least one on-line service available over the communication network 101, or compatibility requirement criteria for at least one software product available for purchasing on-line over the communication network 101. The minimum performance/capability requirement criteria and the compatibility requirement criteria specify the minimum performance/capability a client computer must have in order to be able to utilize the corresponding on-line service and to be compatible with the corresponding software product, respectively.

The client computer 102 may include a client storage 103, which may have stored thereon various user and system computer files and programs, which may be personal to the user of the client computer 102, and thus may be confidential, sensitive or private, the sharing of which with other than the user may be otherwise undesirable.

Figure 2:
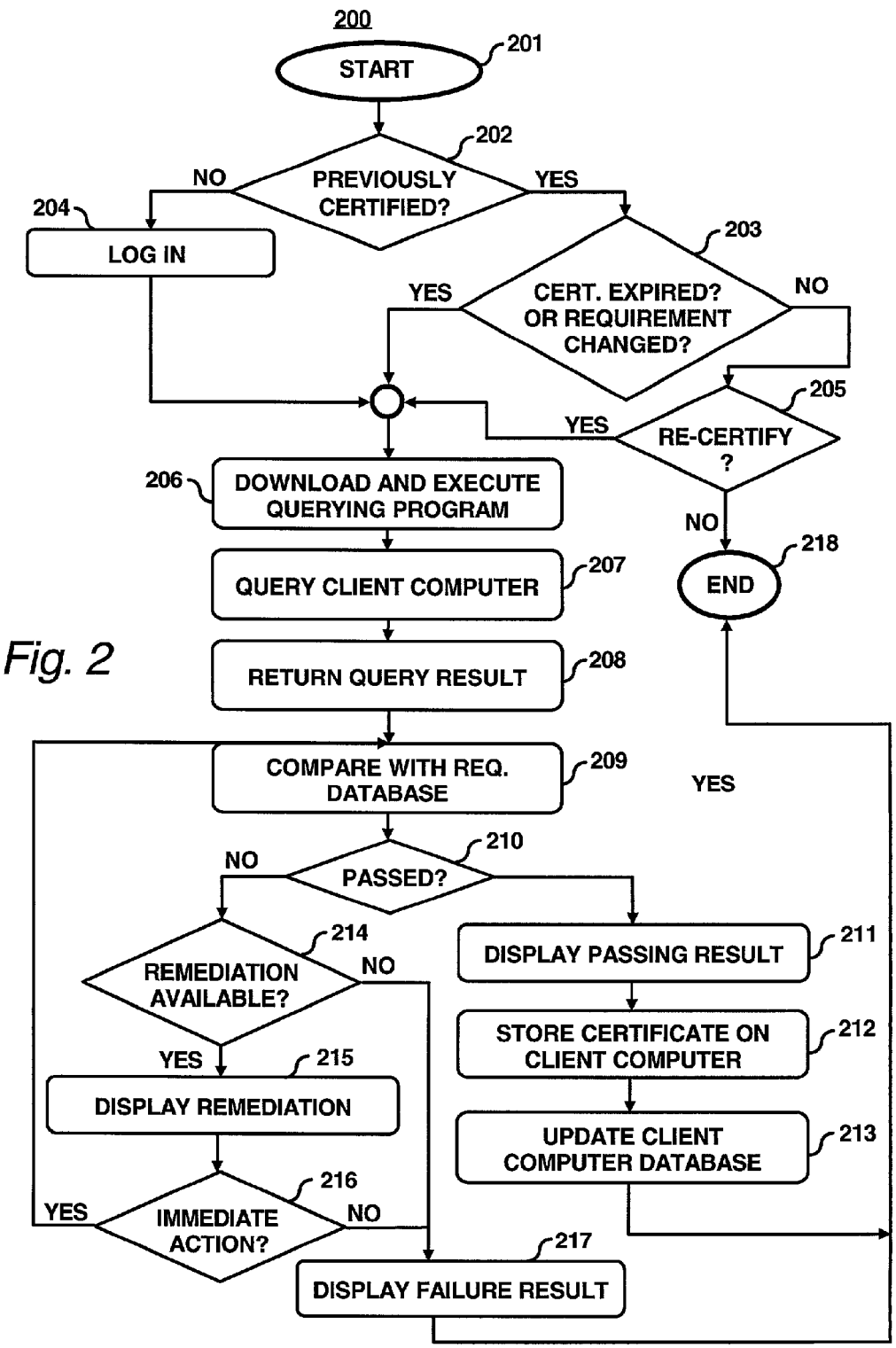
FIG. 2 shows an exemplary flow diagram illustrating the remote client computer performance/compatibility querying and certification process in accordance with the principles of the present invention.

The remote client computer performance/compatibility querying and certification process in accordance with the principles of the present invention will now be described with references to FIG. 2. The process 200 begins in step 201 when a user of a client computer 102 initiates a client computer certification session by establishing a communication link with the server 104, e.g., by providing the universal resource locator (URL) of the server 104.

Once the communication link is established, in step 202, the server 104 makes a determination whether the particular client computer 102 was previously certified. As will be described in more detail later, in an embodiment of the present invention, when a client computer passes the certification process, i.e., is deemed to have sufficient performance/capability for a particular on-line service, the server 104 sends a certification file indicative of the certification to be stored in the passing client computer 102. The certification file is accessible by the server 104, and thus allows the server 104 to make the determination in step 202.

If it was determined that the particular client computer was previously certified, in step 203, the server 104 may verify if the previous certification has since expired or if the certification requirement has changed since the last certification of the client computer 102. If either the previous certification has expired or the certification requirement has changed, the client computer 102 must again be certified, and the process 200 proceeds to the certification steps starting with the step 206.

If the previous certification of the client computer 102 has not expired and if the certification requirement remains the same since the previous certification, the server 104 may indicate to the user of the client computer of the fact of the previous certification, and may prompt the user whether the user wishes to re-certify the client computer in step 205. In an embodiment of the present invention, the certification file may contain a unique identification number corresponding to the particular client computer, which the server 104 may use to retrieve the performance/capability information gathered during the previous certification process stored in the client computer database in the server storage 105, and which may be displayed to the user.

If the user selects not to re-certify, the process ends in step 218. If, on the other hand, the user indicates that he/she wishes to re-certify, e.g., because the user knows that the configuration of the client computer may have changed since the last certification, the certification process begins in step 206.

If the client computer was determined not to have previously certified in step 202, the user may be presented with a "log-in" page prompting the user to enter his/her user identification information and password previously assigned to the particular user. The server 104 compares the user profile database stored in the server storage 105, and if the user identification and the password are correctly entered and matches the corresponding record in the database, allows the user to continue with the certification process beginning at step 206. If the user is not found in the user profile database, the server 104 may prompt the user to register as a new user creating a new user identification and password, and may allow the newly registered user to continue with the certification process. The server 104 may prompt the user to create a unique identification number of the client computer the user wishes to certify if the particular client computer does not already have a record in the client computer database.

In step 206, the server 104 allows the user to download a query program to the client computer 102, and prompts the user to start the execution of the downloaded query program. Once executed, the query program queries the operating system of the client computer 102, to obtain the performance/capability information in step 207.

Figure 3:
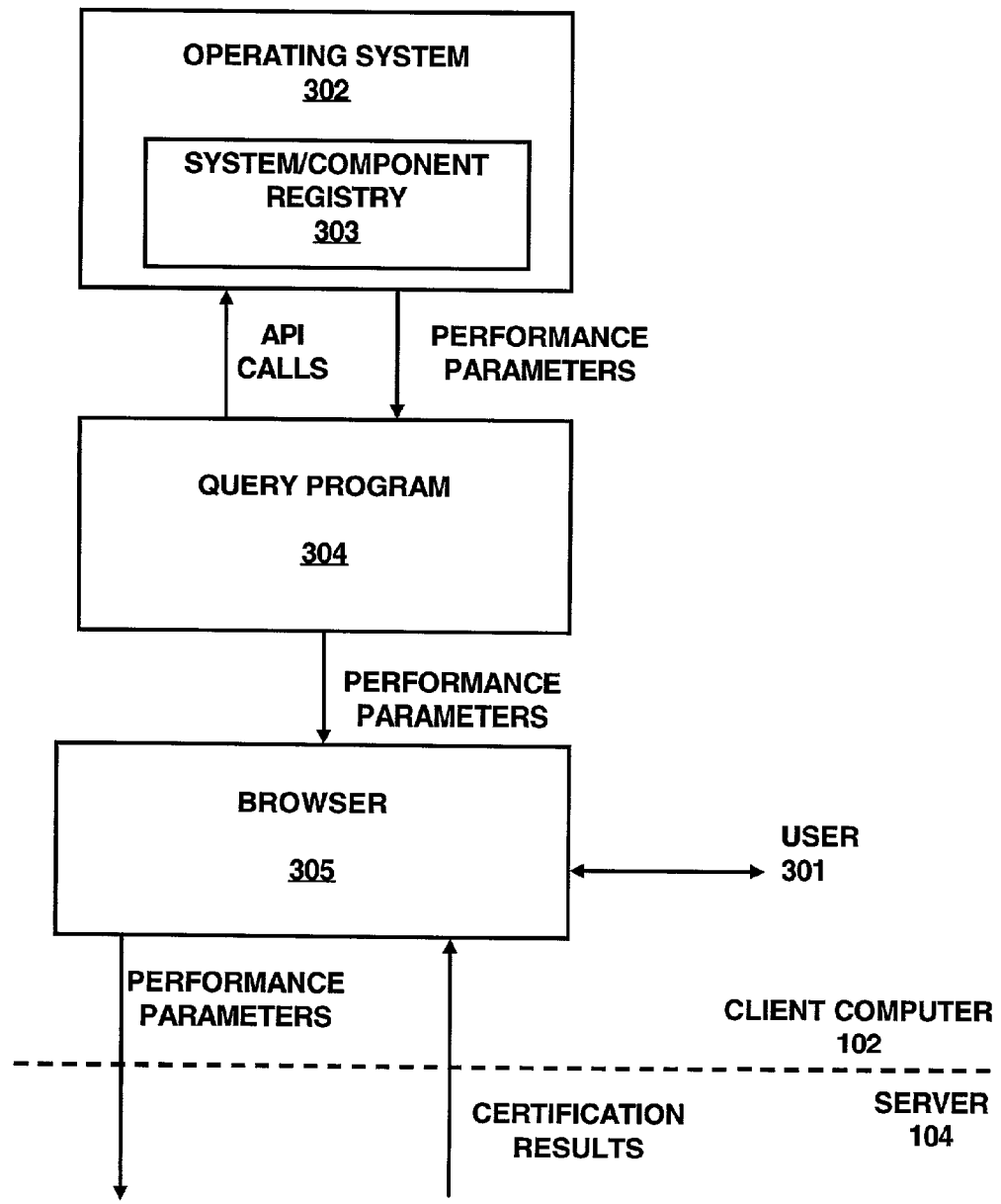
FIG. 3 shows the relevant portions of an exemplary embodiment of the communications between the client computer and the server in accordance with an embodiment of the present invention.

As shown in more detail in FIG. 3, the query program 304 may be any executable program, and issues one or more application program interface (API) function calls, e.g., the "GetSysteminfo" class function calls available in the WINDOWS™ operating system sold by Microsoft Corporation of Redmond, Wash., to the operating system 302. In response to the function calls, the operating system 302 retrieves the information requested by the function calls from the system/component registry 303, returns the retrieved information (which will be referred to as the performance parameters hereafter) back to the query program 304. The performance parameters may be any characteristics of any hardware/software components installed on the client computer 102, which may be, by way of an example only, the processor family and/or speed, the type and the version of the operating system, display resolution capability, installed software components, peripheral devices connected to the client computer and/or the like.

Referring again to FIG. 2, in step 208, the query program 304 transmits the performance parameters to the browser 305, which in turn passes the performance parameters to the server 105 over the communication network 101. While it can be accomplished using any know parameter passing mechanisms, in a preferred embodiment of the present invention, the performance parameters are passed from the query program 304 to the browser 305 as "cookies", as well known to those familiar with web application development.

In step 209, the server 104 in turn compares the received performance parameters against the minimum performance/capability requirement criteria or the compatibility requirement criteria stored in the server storage 105, and, in step 210, based on the performance parameters, determines whether the client computer 102 meets or exceeds the certification criteria.

In step 211, if the client computer passes the certification criteria, the server 104 makes available the certification result indicating the successful certification for viewing by the user 301 (FIG. 3) of the client computer 102 through the browser 305 (FIG. 3).

In step 212, the server 104 sends a certification file to the client computer 102, which may store the file in the client storage 103. The certification file may be any file that may be made available to the server 104 the next time a communication link is established between the browser 305 of the client computer 102 and the server 104. An example of the certification file may be what is usually referred to as a "cookie" as well known to those familiar with web application development, and may contain an indication of successful certification and/or the unique identification number of the client computer 102.

The server 104 then updates the record in the client computer database stored in the server storage 105 corresponding to the particular client computer with the newly gathered performance parameters in step 213. The process then ends in step 218.

If on the other hand, in step 210, it was determined that the client computer 102 did not pass the certification process, the server 104, in step 214, determines whether any remediation may be available for the deficiency(ies), and if remediation is available, displays the remediation to the user 301 In step 215. An exemplary remediation may be to direct the user to download and install an updated version of missing and/or obsolete software by, for example, providing a URL of a website from which the software may be downloaded. In an embodiment of the present invention, if there is an immediate remediation available, e.g., if a missing required software component is available for immediate downloading and installation, the server 104 allows the user of the client computer 102 to choose to immediately correct the deficiency(ies), e.g., download and install the missing software component. If in step 216, the user of the client computer 102 takes the immediate corrective action, the process returns to step 209 to again determine if the certification requirement is now satisfied after the corrective action.

If, on the other hand, there is no remediation available or if the user of the client computer 102 chooses not to perform the available remediation steps, the server 104, in step 217, makes available the certification result indicating the failure for viewing by the user 301 (FIG. 3) of the client computer 102 through the browser 305 (FIG. 3), and the process 200 ends in step 216.

Figure 4:
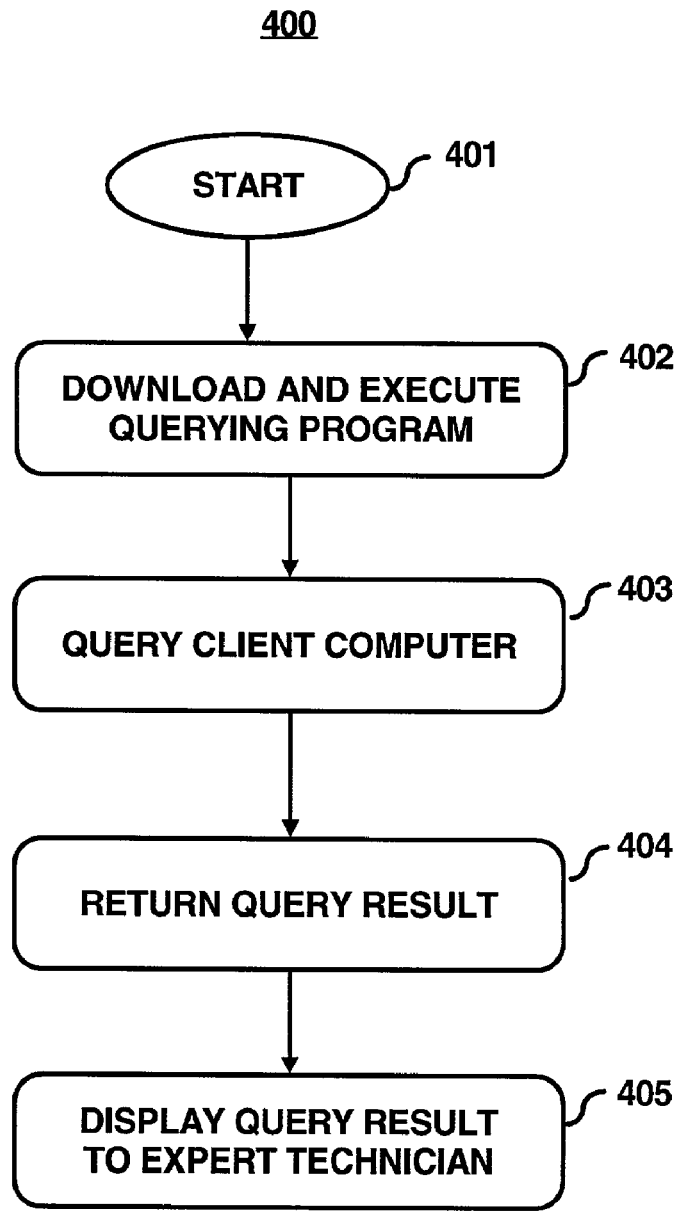
FIG. 4 shows an exemplary flow diagram illustrating the process of providing information regarding one or more components installed on a user computer to an expert technician during an on-line technical support session in accordance with the principles of the present invention.

In an embodiment of the present invention, the querying program 304 may be utilized to provide information regarding the software/hardware components installed on the client computer 102 to an expert technician during an on-line technical support session. In this embodiment, as shown in FIG. 4, the process 400 starts in step 401 when a user establishes an on-line technical support session with the server 104, which in this case provides an on-line technical support service. As previously explained with respect to steps 206, 207 and 208 shown in FIG. 2, in steps 402, 403 and 404, respectively, the query program 304 is downloaded to and executed from the client computer 102, the client computer 102 is queried, and the performance parameters are returned to the server 104. In step 405, the server 104 allows the expert technician to only view the information gathered by the query program 304. In this embodiment, the query program 304 is limited to issuing the API function calls to the operating system of the client computer 102, and may only request information found from the system/component registry 303 of the client computer. Thus, the expert technician is only able to view the registry information, and unable to view, much less copy or modify, any other information that may be personal and/or private, stored in the client computer 102.

While the invention has been described with reference to the exemplary embodiments thereof, those skilled in the art will be able to make various modifications to the described embodiments of the invention without departing from the true spirit and scope of the invention.

What is claimed is:

1. A method of querying a client computer by a server over a communication network to determine whether said client computer has sufficient performance capability in order to utilize an on-line service, comprising:
    allowing a query program to be downloaded to said client computer, said query program, upon execution, querying said client computer for at least one performance parameter;
    transmitting said at least one performance parameter to said server;
    determining whether said client computer has a sufficient performance capability to utilize said on-line service based on said at least one performance parameter; and
    storing a certification file in said client computer only if said client computer is determined to have said sufficient performance capability, said certification file being accessible by said server.

2. The method of querying a client computer in accordance with claim 1, further comprising:
    determining whether said client computer was previously certified, said client computer being previously certified if a certification file is stored in said client computer.

3. The method of querying a client computer in accordance with claim 1, wherein:
    said query program is configured to issue one or more application program interface function calls to an operating system of said client computer, said operating system returning said at least one performance parameter in response to said one or more application program interface function calls.

4. The method of querying a client computer in accordance with claim 1, further comprising:
    storing a certification criteria in a storage of said server.

5. The method of querying a client computer in accordance with claim 4, wherein said step of determining whether said client computer has said sufficient performance capability comprises:
    comparing said at least one performance parameter against said certification criteria.

6. The meted of querying a client computer in accordance with claim 1, further comprising:
    suggesting a remediation to a user of said client computer if it was determined that said client computer does not have said sufficient performance capability.

7. The method of querying a client computer in accordance with claim 1, further comprising:
    storing a client computer database in a storage of said server.

8. The method of querying a client computer in accordance with claim 7, further comprising:
    updating said client computer database with said at least one performance parameter.

9. A computer readable storage medium on which is embedded one or more computer programs, said one or more computer programs implementing a method of querying a client computer by a server over a communication network to determine whether said client computer has sufficient performance capability in order to utilize an on-line service, said one or more computer programs comprising a set of instructions for:

allowing a query program to be downloaded to said client computer, said query program, upon execution, querying said client computer for at least one performance parameter;

transmitting said at least one performance parameter to said server;

determining whether said client computer has a sufficient performance capability to utilize said on-line service based on said at least one performance parameter; and storing a certification file in said client computer only if said client computer is determined to have said sufficient performance capability, said certification file being accessible by said server.

10. The computer readable storage medium according to claim 9, wherein said one or more computer programs further comprise a set of instructions for:

determining whether said client computer was previously certified, said client computer being previously certified if a certification file is stored in said client computer.

11. The computer readable storage medium according to claim 9, wherein:

said query program is configured to issue one or more application program interface function calls to an operating system of said client computer, said operating system returning said at least one performance parameter in response to said one or more application program interface function calls.

12. The computer readable storage medium according to claim 9, wherein said one or more computer programs further comprise a set of instructions for:

storing a certification criteria in a storage of said server.

13. The computer readable storage medium according to claim 12, wherein said one or more computer programs further comprise a set of instructions for:

comparing said at least one performance parameter against said certification criteria.

14. The computer readable storage medium according to claim 9, wherein said one or more computer programs further comprise a set of instructions for:

suggesting a remediation to a user of said client computer if it was determined that said client computer does not have said sufficient performance capability.

15. The computer readable storage medium according to claim 9, wherein said one or more computer programs further comprise a set of instructions for:

storing a client computer database in a storage of said server.

16. The computer readable storage medium according to claim 15, wherein said one or more computer programs further comprise a set of instructions for:

updating said client computer database with said at least one performance parameter.

17. A system for remotely querying a client computer by a server over a communication network, comprising:

a communication network; and a server configured to allow a query program to be downloaded to said client computer, said query program, upon execution, querying said client computer for at least one performance parameter, said server further configured to receive said at least one performance parameter from said querying program, to determine whether said client computer has a sufficient performance capability to utilize an on-line service based on said at least one performance parameter, and to store a certification file in said client computer only if said client computer is determined to have said sufficient performance capability, said certification file being accessible by said server.

18. The system for remotely querying a client computer according to claim 17, wherein:

said server is configured to determine whether said client computer was previously certified, said client computer being previously certified if a certification file is stored in said client computer.

19. The system for remotely querying a client computer according to claim 17, wherein:

said query program is configured to issue one or more application program interface function calls to an operating system of said client computer, said operating system returning said at least one performance parameter in response to said one or more application program interface function calls.

20. The system for remotely querying a client computer according to claim 17, wherein:

said server is configured to store a certification criteria in a storage of said server.

21. The system for remotely querying a client computer according to claim 20, wherein:

said server is configured to compare said at least one performance parameter against said certification criteria.

22. The system for remotely querying a client computer according to claim 17, wherein:

said server is configured to suggest a remediation to a user of said client computer if it was determined that said client computer does not have said sufficient performance capability.

23. The system for remotely querying a client computer according to claim 17, wherein:

said server is configured to store a client computer database in a storage of said server.

24. The system for remotely querying a client computer according to claim 23, wherein:

said server is configured to update said client computer database with said at least one performance parameter.

* * * * *